United States Patent
McCrary (10) Patent No.: US 7,219,571 B2
(45) Date of Patent: May 22, 2007

(54) TRANSMISSION HAVING AN ELECTRO-MECHANICAL GEAR ACTUATION SYSTEM

(75) Inventor: Paul T. McCrary, Belleville, MI (US)

(73) Assignee: BorgWarner, Inc., Auburn Hills, MI (US)

( * ) Notice: Subject to any disclaimer, the term of this patent is extended or adjusted under 35 U.S.C. 154(b) by 215 days.

(21) Appl. No.: 10/988,763

(22) Filed: Nov. 15, 2004

(65) Prior Publication Data

US 2006/0101932 A1   May 18, 2006

(51) Int. Cl.
*F16H 59/00* (2006.01)

(52) U.S. Cl. .......................................... 74/335; 74/340

(58) Field of Classification Search .................. 74/335, 74/336 R, 340, 339, 473.36, 473.37, 89.28; 318/75 R, 83
See application file for complete search history.

(56) References Cited

U.S. PATENT DOCUMENTS

| | | | | |
|---|---|---|---|---|
| 4,449,416 A | * | 5/1984 | Huitema | 74/336 R |
| 6,065,363 A | | 5/2000 | Schaller et al. | 74/473.12 |
| 6,105,448 A | | 8/2000 | Borschert et al. | 74/335 |
| 6,286,381 B1 | * | 9/2001 | Reed et al. | 74/336 R |
| 6,321,612 B1 | | 11/2001 | Leimbach et al. | 74/335 |
| 6,334,371 B1 | | 1/2002 | Stengel et al. | 74/473.12 |
| 6,349,608 B1 | | 2/2002 | Lenzi | 74/473.12 |
| 6,364,809 B1 | * | 4/2002 | Cherry | 477/86 |
| 6,470,764 B1 | | 10/2002 | Yamaguchi et al. | 74/335 |
| 6,792,821 B1 | | 9/2004 | Yamamoto | 74/335 |
| 6,834,562 B2 | | 12/2004 | Esly et al. | 74/335 |
| 2001/0037698 A1 | * | 11/2001 | Yamamoto et al. | 74/335 |

* cited by examiner

*Primary Examiner*—Roger Pang
*Assistant Examiner*—Justin K. Holmes
(74) *Attorney, Agent, or Firm*—Greg Dziegielewski; Bliss McGlynn, P.C.

(57) ABSTRACT

A transmission having an electromechanical gear actuation system includes an input shaft, a counter shaft, and a plurality of gear sets that are adapted to be operatively engaged to and disengaged from their shafts. A plurality of synchronizers operatively engage and disengage the gear sets to and from the shafts. A shifter rail includes a plurality of shift forks that are each in operative engagement with at least one of the synchronizers. A motor assembly provides a first motive force to cause the shifter rail to selectively engage one shift fork and further adapted to provide a second motive force to operatively drive the shifter rail to cause the associated shift fork and synchronizer to engage and disengage the associated gear set to and from the associated shaft. A solenoid assembly controls when the motor assembly provides the first motive force and the second motive force.

18 Claims, 6 Drawing Sheets

TRANSMISSION HAVING AN ELECTRO-MECHANICAL GEAR ACTUATION SYSTEM

BACKGROUND OF THE INVENTION

1. Field of the Invention

The present invention relates, generally, to a transmission for a motor vehicle that includes a gear actuation system, and more specifically to a transmission having a gear actuation system that electro-mechanically performs both gear selection and gear engagement.

2. Description of the Related Art

Generally speaking, land vehicles require a powertrain consisting of three basic components. These components include a power plant (such as an internal combustion engine), a power transmission, and wheels. The power transmission component is typically referred to simply as the "transmission." Engine torque and speed are converted in the transmission in accordance with the tractive-power demand of the vehicle. Presently, there are two typical transmissions widely available for use in conventional motor vehicles. The first and oldest type is the manually operated transmission. These transmissions include a foot-operated start-up or launch clutch that engages and disengages the driveline with the power plant and a gearshift lever to selectively change the gear ratios within the transmission. When driving a vehicle having a manual transmission, the driver must coordinate the operation of the clutch pedal, the gearshift lever, and the accelerator pedal to achieve a smooth and efficient shift from one gear to the next. The structure of a manual transmission is simple and robust and provides good fuel economy by having a direct power connection from the engine to the final drive wheels of the vehicle. Additionally, since the operator is given complete control over the timing of the shifts, the operator is able to dynamically adjust the shifting process so that the vehicle can be driven most efficiently. One disadvantage of the manual transmission is that there is an interruption in the drive connection during gear shifting. This results in losses in efficiency. In addition, there is a great deal of physical interaction required on the part of the operator to shift gears in a vehicle that employs a manual transmission.

The second and newer choice for the transmission of power in a conventional motor vehicle is an automatic transmission. Automatic transmissions offer ease of operation. The driver of a vehicle having an automatic transmission is not required to use both hands, one for the steering wheel and one for the gearshift, and both feet, one for the clutch and one for the accelerator and brake pedal in order to safely operate the vehicle. In addition, an automatic transmission provides greater convenience in stop and go situations, because the driver is not concerned about continuously shifting gears to adjust to the ever-changing speed of traffic. Although conventional automatic transmissions avoid an interruption in the drive connection during gear shifting, they suffer from the disadvantage of reduced efficiency because of the need for hydrokinetic devices, such as torque converters, interposed between the output of the engine and the input of the transmission for transferring kinetic energy therebetween. In addition, automatic transmissions are typically more mechanically complex and therefore more expensive than manual transmissions.

For example, torque converters typically include impeller assemblies that are operatively connected for rotation with the torque input from an internal combustion engine, a turbine assembly that is fluidly connected in driven relationship with the impeller assembly and a stator or reactor assembly. These assemblies together form a substantially toroidal flow passage for kinetic fluid in the torque converter. Each assembly includes a plurality of blades or vanes that act to convert mechanical energy to hydrokinetic energy and back to mechanical energy. The stator assembly of a conventional torque converter is locked against rotation in one direction but is free to spin about an axis in the direction of rotation of the impeller assembly and turbine assembly. When the stator assembly is locked against rotation, the torque is multiplied by the torque converter. During torque multiplication, the output torque is greater than the input torque for the torque converter. However, when there is no torque multiplication, the torque converter becomes a fluid coupling. Fluid couplings have inherent slip. Torque converter slip exists when the speed ratio is less than 1.0 (RPM input>than RPM output of the torque converter). The inherent slip reduces the efficiency of the torque converter.

While torque converters provide a smooth coupling between the engine and the transmission, the slippage of the torque converter results in a parasitic loss, thereby decreasing the efficiency of the entire powertrain. Further, the torque converter itself requires pressurized hydraulic fluid in addition to any pressurized fluid requirements for the actuation of the gear shifting operations. This means that an automatic transmission must have a large capacity pump to provide the necessary hydraulic pressure for both converter engagement and shift changes. The power required to drive the pump and pressurize the fluid introduces additional parasitic losses of efficiency in the automatic transmission.

In an ongoing attempt to provide a vehicle transmission that has the advantages of both types of transmissions with fewer of the drawbacks, combinations of the traditional "manual" and "automatic" transmissions have evolved. Most recently, "automated" variants of conventional manual transmissions have been developed which shift automatically without any input from the vehicle operator. Such automated, or automatic, manual transmissions (AMTs) typically include a plurality of power-operated actuators that are controlled by a transmission controller or some type of electronic control unit (ECU) to automatically shift synchronized clutches that control the engagement of meshed gear wheels traditionally found in manual transmissions. The design variants have included either electrically or hydraulically powered actuators to affect the gear changes. The development of AMTs has provided a viable and improved means of power transmission for motor vehicles over the conventional automatic transmissions having a torque converter. However, even with the inherent improvements of these newer automated transmissions, they still have an operative power interruption in the drive connection between the input shaft and the output shaft during sequential gear shifting. Power interrupted shifting results in a distinct shift feel that is generally associated with manual transmissions and may considered undesirable in certain operating environments.

To eliminate the power interruption in AMTs, other automated manual type transmissions have been developed that can be power-shifted to permit gearshifts to be made under load. Examples of such power-shifted automated manual transmissions are shown in U.S. Pat. No. 5,711,409 issued on Jan. 27, 1998 to Murata for a Twin-Clutch Type Transmission, and U.S. Pat. No. 5,966,989 issued on Apr. 4, 2000 to Reed, Jr. et al for an Electro-mechanical Automatic Transmission having Dual Input Shafts. These particular types of automated manual transmissions have two clutches and are generally referred to simply as dual, or twin, clutch transmissions (DCTs). The dual clutch structure is most often coaxially and cooperatively configured to derive power input from a single engine flywheel arrangement. However, some designs have a dual clutch assembly that is coaxial, but with the clutches located on opposite sides of the transmissions body and having different input sources. Regardless, the layout is the equivalent of having two transmissions in one housing, namely one power transmission assembly on each of two input shafts concomitantly driving one output shaft. Each transmission can be shifted and clutched independently. In this manner, uninterrupted power upshifting and downshifting between gears, along with the high mechanical efficiency of a manual transmission is available in an automatic transmission form. Thus, significant increases in fuel economy and vehicle performance may be achieved through the effective use of certain automated manual transmissions.

The dual clutch transmission structure may include two dry disc clutches each with their own clutch actuator to control the engagement and disengagement of the two-clutch discs independently. While the clutch actuators may be of the electromechanical type, since a lubrication system within the transmission requires a pump, some dual clutch transmissions utilize hydraulic shifting and clutch control. These pumps are most often gerotor types, and are much smaller than those used in conventional automatic transmissions because they typically do not have to supply a torque converter. Thus, any parasitic losses are kept small. Shifts are accomplished by engaging the desired gear prior to a shift event and subsequently engaging the corresponding clutch. With two clutches and two inputs shafts, at certain times, the dual clutch transmission may be in two different gear ratios at once, but only one clutch will be engaged and transmitting power at any given moment. To shift to the next higher gear, first the desired gears on the input shaft of the non-driven clutch assembly are engaged, then the driven clutch is released and the non-driven clutch is engaged.

This requires that the dual clutch transmission be configured to have the forward gear ratios alternatingly arranged on their respective input shafts. In other words, to perform up-shifts from first to second gear, the first and second gears must be on different input shafts. Therefore, the odd gears will be associated with one input shaft and the even gears will be associated with the other input shaft. In view of this convention, the input shafts are generally referred to as the odd and even shafts. Typically, the input shafts transfer the applied torque to a single counter shaft, which includes mating gears to the input shaft gears. The mating gears of the counter shaft are in constant mesh with the gears on the input shafts. The counter shaft also includes an output gear that is meshingly engaged to a gear on the output shaft. Thus, the input torque from the engine is transferred from one of the clutches to an input shaft, through a gear set to the counter shaft and from the counter shaft to the output shaft.

Gear selection and gear engagement in either an AMT or a DCT is similar to that in a conventional manual transmission. One of the gears in each of the gear sets is disposed on its respective shaft in such a manner so that it can freewheel about the shaft. A synchronizer is also disposed on the shaft next to the freewheeling gear so that the synchronizer can selectively engage the gear to the shaft. To automate these transmissions, the mechanical selection of each of the gear sets is typically performed by some type of actuator that moves a shift fork that operatively moves the synchronizers. More specifically, the gear selection and engagement is accomplished by actuating one of a number of shift actuators, with each shift actuator being responsible for engaging a particular synchronizer, and thereby a gear set to its particular shaft. The majority of the newer AMT and DCT designs employ 6 forward gears and a reverse gear, which provides greater efficiency and fuel economy by having closer ratio gear sets than previous designs. However, this also requires between four to seven shift actuators to provide the selective gear engagement. Seven shift actuators are necessary if each gear set employs its own separate shift actuator, and four are necessary if the transmission is designed to employ double-sided, or dual-activating shift actuators that work with paired synchronizers.

Regardless of the exact number, the use of a several separate and generally complex components to provide control over the selective gear actuation in an AMT or DCT is a costly and inefficient approach in automating the relatively simple structure of a manual transmission. With a manual transmission, once the clutch is disengaged, the operator moves a single gear selector into one of a number of positions that mechanically selects the desired gear. The gear selector is operatively connected to one or two shifter rails that each include a number of shift forks that are operatively connected to the synchronizers of the transmission. A set of linkages is sometimes required to couple the gear selector to the shift forks, but the overall design of traditional manual transmissions is relatively simple and efficient. However, the conventional approaches to automating the simple manual transmission structure to provide the current AMT and DCT designs is in sharp contrast to the simplicity of the manual transmission and needlessly complicates the overall structure.

This added-on structural complexity increases manufacturing and assembly costs of the AMT and DCT transmissions. First, each of the separate components must be individually assembled and then separately installed throughout different portions of the transmission. Second, since the shift actuators of this type are most often hydraulic, having a number of these components necessitates the use of the separate hydraulic lines and connections to provide the proper fluid communication between the components and their control devices. When using hydraulic actuators and control devices, inefficiencies also arise from operative performance losses through the hydraulic piping. This also introduces actuation delays and hysteresis to the AMT and DCT operation since the components are not in immediate proximity to each other.

Furthermore, hydraulic components are ultimately electrically controlled by solenoids, such that employing separate hydraulic actuation components requires a number of separate wiring harnesses to electrically connect each electro-hydraulic part, further increasing transmission cost and complexity. The use of separate hydraulic and electrical connections for each separate actuation and control component also increases the likelihood of a failure at these connection points either during manufacture or during the service life of the transmission. The use of some type of non-hydraulic combined or integrated gear selection and engagement system rather than the multi-component conventional gear actuation means for AMTs and DCTs would require many fewer parts, take up less space, be much more cost efficient, and energy efficient.

Accordingly, there exists a need in the related art for a transmission gear actuation system that electro-mechanically performs both gear selection and gear engagement for either an automated manual transmission or a dual clutch transmission application and which replaces many of the previously separate components that are used to control the selective gear engagement.

SUMMARY OF THE INVENTION

The disadvantages of the related art are overcome by a transmission for a motor vehicle that has an electromechanical gear actuation system for gear selection and gear engagement and disengagement. The transmission includes at least one input shaft, a counter shaft, and a plurality of gear sets rotatively disposed on the at least one input shaft and the counter shaft. The gear sets are adapted to be operatively engaged to and disengaged from the associated shafts. A plurality of synchronizers are disposed about the gear sets that are adapted to operatively engage and disengage the gear sets to and from the associated shafts. At least one shifter rail is slidingly disposed within the transmission parallel to the shafts that includes a plurality of shift forks, each shift fork is in operative engagement with at least one of the synchronizers. The shifter rail is adapted to slidingly move and selectively cause one of the shift forks to move the associated synchronizer. A motor assembly is disposed within the transmission adjacent to the shifter rail that is adapted to provide a first motive force to cause the shifter rail to selectively engage one particular shift fork. The motor assembly is further adapted to provide a second motive force to operatively drive the shifter rail to cause the associated shift fork and synchronizer to engage and disengage the associated gear set to and from the associated shaft. A solenoid assembly is s adapted to selectively control the gear actuation system so as to control when the motor assembly provides the first motive force and when the motor assembly provides the second motive force.

In this manner, the costly and inefficient approaches of the prior art in automating the relatively simple structure of a manual transmission are overcome by the present invention. The present invention avoids the use of several separate and generally complex hydraulic components to provide control over the selective gear actuation in an AMT or DCT. Further, by not adding the structural complexity of the hydraulic control and actuation systems, the present invention avoids the additional manufacturing and assembly costs that are added to the transmission when hydraulics are employed. Additionally, by employing a single electro-mechanical gear actuation system, the transmission of the present invention overcomes the requirement for a number of separate wiring harnesses to electrically connect a series of electro-hydraulic parts. Thus, the wiring harness for the transmission of the present invention is also simplified and costs less to produce than those of prior art systems. Overall, the transmission of the present invention having an electromechanical gear actuation system is more efficient and cost effective that any of the prior art designs for automated manual transmissions and dual clutch transmissions.

Other objects, features, and advantages of the present invention will be readily appreciated, as the same becomes better understood after reading the subsequent description taken in connection with the accompanying drawings

DETAILED DESCRIPTION OF THE PREFERRED EMBODIMENT(S)

The present invention relates, generally, to a transmission for a motor vehicle that includes a gear actuation system, and more specifically to a transmission having a gear actuation system that electro-mechanically performs both gear selection and gear engagement. Generally speaking, a transmission forms a portion of a vehicle powertrain and is responsible for taking a torque input from a prime mover, such as an internal combustion engine, and transmitting the torque through selectable gear ratios to the vehicle drive wheels. With regard to the recent evolution in vehicle transmissions that has produced a number of automated "manual" types of transmissions, the present invention overcomes the remaining shortcomings and drawbacks related to employing separate hydraulic components to perform gear selection and gear engagement in these transmissions.

Figure 1:
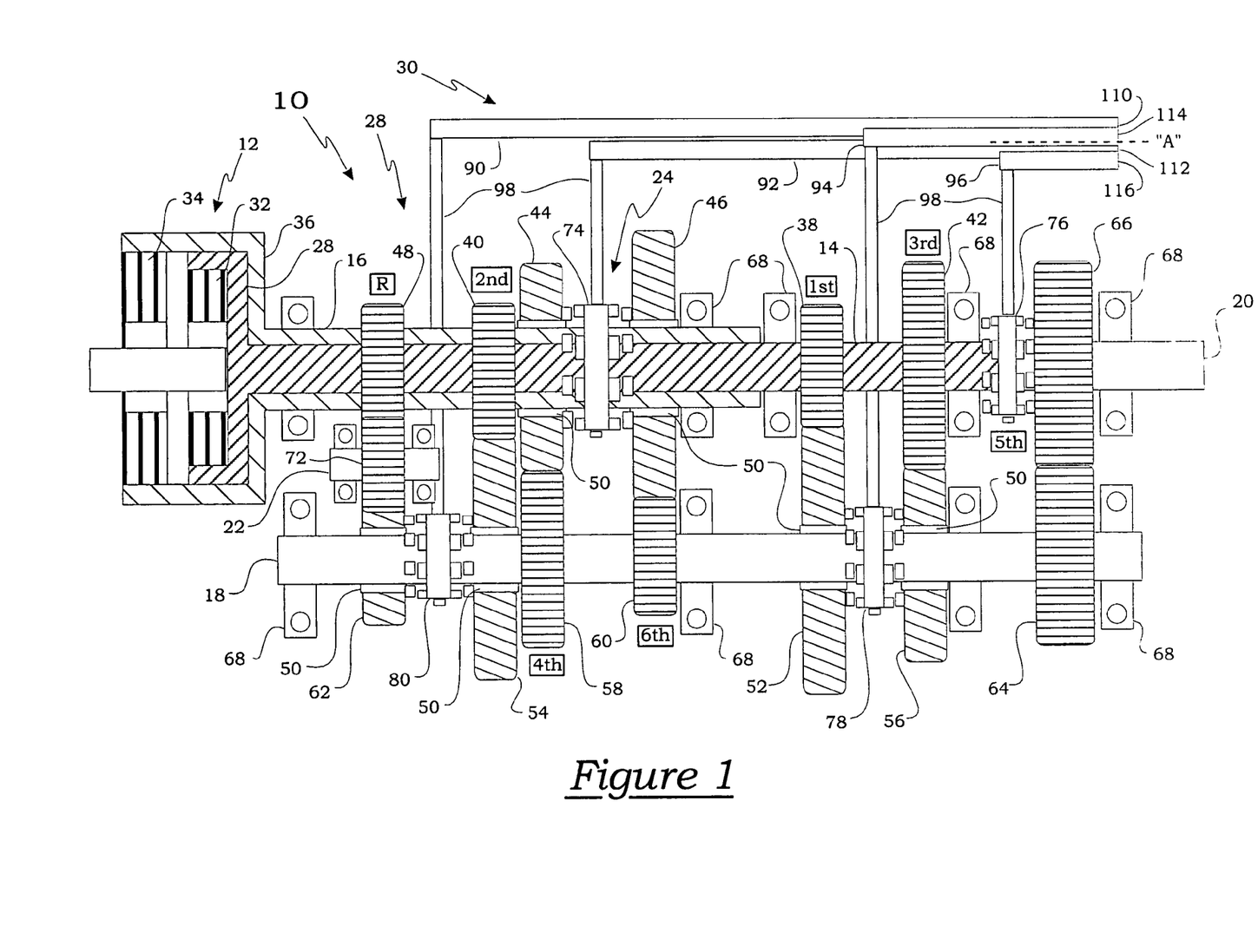
FIG. 1 is a generalized schematic illustration of a dual clutch transmission that may be employed with the present invention.

For example, one embodiment of a transmission having an electromechanical gear actuation system of the present invention is generally indicated at 10 in the schematic illustration of FIG. 1. In this particular example, FIG. 1 illustrates a dual clutch transmission 10 that has at least one input shaft, which in this embodiment includes the specific structure of a first input shaft, generally indicated at 14, and a second input shaft, generally indicated at 16, that is coaxial to the first. The transmission 10 also includes a dual, coaxial clutch assembly generally indicated at 12, a counter shaft, generally indicated at 18, an output shaft 20, a reverse counter shaft 22, and a plurality of synchronizers, generally indicated at 24.

The dual clutch transmission 10 forms a portion of a vehicle powertrain and is responsible for taking a torque input from a prime mover, such as an internal combustion engine, and transmitting the torque through selectable gear ratios to the vehicle drive wheels. The dual clutch transmission 10 operatively routes the applied torque from the engine through the dual, coaxial clutch assembly 12 to either the first input shaft 14 or the second input shaft 16. The input shafts 14 and 16 include a plurality of gear sets, generally indicated at 28. More specifically, the gear sets 28 include a first series of gears, which are disposed on the input shafts 14 and 16, in constant mesh with a second series of gears that are disposed on the counter shaft 18. Each one of the first series of gears interacts with one of the second series of gears to provide the different gear ratios used for transferring torque. The counter shaft 18 also includes a first output gear that is in constant mesh with a second output gear disposed on the output shaft 20.

The plurality of synchronizers 24 are disposed on the two input shafts 14, 16 and on the counter shaft 18 and are operatively controlled by a plurality of shift actuators 26 (discussed in reference to FIG. 2 below) to selectively engage the gear sets 28. Thus, torque is transferred from the engine to the dual, coaxial clutch assembly 12, to one of the input shafts 14 or 16, to the counter shaft 18 through one of the gear sets 28, and to the output shaft 20. The output shaft 20 further provides the output torque to the remainder of the powertrain. Additionally, the reverse counter shaft 22 includes an intermediate gear that is disposed between one of the first series of gears and one of the second series of gears, which allows for a reverse rotation of the counter shaft 18 and the output shaft 20. Each of these components will be discussed in greater detail below.

Specifically, the dual, coaxial clutch assembly 12 includes a first clutch mechanism 32 and a second clutch mechanism 34. The first clutch mechanism 32 is, in part, physically connected to a portion of the engine flywheel (not shown) and is, in part, physically attached to the first input shaft 14, such that the first clutch mechanism 32 can operatively and selectively engage or disengage the first input shaft 14 to and from the flywheel. Similarly, the second clutch mechanism 34 is, in part, physically connected to a portion of the flywheel and is, in part, physically attached to the second input shaft 16, such that the second clutch mechanism 34 can operatively and selectively engage or disengage the second input shaft 16 to and from the flywheel. As can be seen from FIG. 1, the first and second clutch mechanisms 32, 34 are coaxial and concentric such that the outer case 28 of the first clutch mechanism 32 fits inside of the outer case 36 of the second clutch mechanism 34. Similarly, the first and second input shafts 14, 16 are also coaxial and concentric such that the second input shaft 16 is hollow having an inside diameter sufficient to allow the first input shaft 14 to pass through and be partially supported by the second input shaft 16. It should be appreciated that, although not illustrated herein, the first and second clutch mechanisms 32, 34 and the first and second input shafts 14, 16 may be physically arranged within the transmission in a parallel, rather than concentric structure.

The first input shaft 14 includes a first input gear 38 and a third input gear 42. The first input shaft 14 is longer in length than the second input shaft 16 so that the first input gear 38 and a third input gear 42 are disposed on the portion of the first input shaft 14 that extends beyond the second input shaft 16. The second input shaft 16 includes a second input gear 40, a fourth input gear 44, a sixth input gear 46, and a reverse input gear 48. As shown in FIG. 1, the second input gear 40 and the reverse input gear 48 are fixedly supported on the second input shaft 16 and the fourth input gear 44 and sixth input gear 46 are rotatably supported about the second input shaft 16 upon bearing assemblies 50 so that their rotation is unrestrained unless the accompanying synchronizer is engaged, as will be discussed in greater detail below.

The counter shaft 18 is a single, one-piece shaft that includes the opposing, or counter, gears to those on the inputs shafts 14, 16. As shown in FIG. 1, the counter shaft 18 includes a first counter gear 52, a second counter gear 54, a third counter gear 56, a fourth counter gear 58, a sixth counter gear 60, and a reverse counter gear 62. The counter shaft 18 fixedly retains the fourth counter gear 58 and sixth counter gear 60, while first, second, third, and reverse counter gears 52, 54, 56, 62 are supported about the counter shaft 18 by bearing assemblies 50 so that their rotation is unrestrained unless the accompanying synchronizer is engaged as will be discussed in greater detail below. The counter shaft 18 also fixedly retains a first drive gear 64 that meshingly engages the corresponding second driven gear 66 on the output shaft 20. The second driven gear 66 is fixedly mounted on the output shaft 20. The output shaft 20 extends outward from the transmission 10 to provide an attachment for the remainder of the powertrain.

The reverse counter shaft 22 is a relatively short shaft having a single reverse intermediate gear 72 that is disposed between, and meshingly engaged with, the reverse input gear 48 on the second input shaft 16 and the reverse counter gear 62 on the counter shaft 18. Thus, when the reverse gears 48, 62, and 72 are engaged, the reverse intermediate gear 72 on the reverse counter shaft 22 causes the counter shaft 18 to turn in the opposite rotational direction from the forward gears thereby providing a reverse rotation of the output shaft 20. It should be appreciated that all of the shafts of the dual clutch transmission 10 are disposed and rotationally secured within the transmission 10 by some manner of bearing assembly such as roller bearings, for example, shown at 68 in FIG. 1.

The engagement and disengagement of the various forward and reverse gears is accomplished by the actuation of the synchronizers 24 within the transmission. As shown in FIG. 1 in this example of a dual clutch transmission 10, there are four synchronizers 74, 76, 78, and 80 that are utilized to shift through the six forward gears and reverse. It should be appreciated that there are a variety of known types of synchronizers that are capable of engaging a gear to a shaft and that the particular type employed for the purposes of this discussion is beyond the scope of the present invention. Generally speaking, any type of synchronizer that is movable by a shift fork or like device may be employed. As shown in the representative example of FIG. 1, the synchronizers are two sided, dual actuated synchronizers, such that they engage one gear to its respective shaft when moved off of a center neutralized position to the right and engage another gear to its respective shaft when moved to the left.

Specifically with reference to the example illustrated in FIG. 1, synchronizer 78 can be actuated to the left to engage the first counter gear 52 on the counter shaft 18 or actuated to the right to engage the third counter gear 56. Synchronizer 80 can be actuated to the left to engage the reverse counter gear 62 or actuated to the right to engage the second counter gear 54. Likewise, synchronizer 74 can be actuated to the left to engage the fourth input gear 44 or actuated to the right to engage the sixth input gear 46. Synchronizer 76 is actuated to the right to directly engage the end of the first input shaft 14 to the output shaft 20 thereby providing a direct 1:1 (one to one) drive ratio for fifth gear. There is no gear set to engage to the left of synchronizer 76. It should be appreciated that this example of the dual clutch transmission is representative and that other gear set, synchronizer, and shift actuator arrangements are possible within the dual clutch transmission 10 as long as the even and odd gear sets are disposed on opposite input shafts.

It should be further appreciated that the general operation of the dual clutch transmission 10 may be managed by some type of higher-level control device such as an electronic control unit (ECU) that oversees the functioning of the operation of the vehicle. It should be further appreciated that the transmission may also be designed to take direct inputs from a variety of sources to control the functions of the transmission directly such that a cooperative interaction with other vehicle control devices may be employed rather than a transmission management subordination scheme under a higher-level control device The first and second clutch mechanisms 32 and 34 of the dual, coaxial clutch assembly 12 are operatively engaged and disengaged in a coordinated manner relative to the actuator of the various gear sets by the synchronizer 24 to selectively transfer torque to the output shaft 20. By way of example, if torque is being transferred to the drive wheels of the vehicle to initiate movement from a standing start, the lowest, or first, gear ratio of the dual clutch transmission 10 will likely be engaged. Therefore, as seen in FIG. 1, synchronizer 78 will be driven to the left to engage the first counter gear 52 to the counter shaft 18 and the first clutch mechanism 32 will be engaged to transfer torque from the engine to the output shaft 20 through the first gear set. When vehicle speed increases and it is determined that the conditions require a shift to the second gear set, synchronizer 80 will first be driven to the right to engage the second counter gear 54 to the counter shaft 18. Then the second clutch mechanism 34 will be engaged as the first clutch mechanism 32 is disengaged. In this manner, a powershift, where no power interruption occurs, is affected. Additionally, while engaged and driving a particular gear, the first and second clutch mechanisms 32 and 34 are controlled by certain stored routines that provide varying amounts of engagement force to the clutch discs and thereby operatively control the amount of torque transferred across the clutches.

Most often, in conventional dual clutch transmissions, the two sided, dual actuated synchronizers 24 are operatively controlled by four separate hydraulically actuated shift actuators that are also two sided and dual actuating. However, as previously discussed, this approach of employing separate hydraulic shift actuators is costly and needlessly complex. With regard to a dual clutch transmission, to replace the hydraulic components, the example of the dual clutch transmission 10 schematically illustrated in FIG. 1, also includes at least one shifter rail, generally indicated at 30, and a plurality of shift forks 98. More specifically, the transmission 10 includes four separate shifter rails 90, 92, 94, and 96 that are slidingly disposed within the transmission parallel to the input shafts 14, 16 and the output shaft 20. Each one of the plurality of shifter rails 90, 92, 94, and 96 are in operative engagement with one of the shift forks 98. Each of the shift forks 98 is in operative engagement with the synchronizers 24. The shifter rails 90, 92, 94, and 96 are adapted to slidingly move to selectively cause their respective shift fork 98 to move its respective synchronizer 24. In this manner, each shifter rail 90, 92, 94, and 96 will move its shift fork rectilinearly (either right or left, as illustrated) from a neutral center position to cause its particular synchronizer to engage either one of the associated gear sets to the associated shaft.

Figure 2:
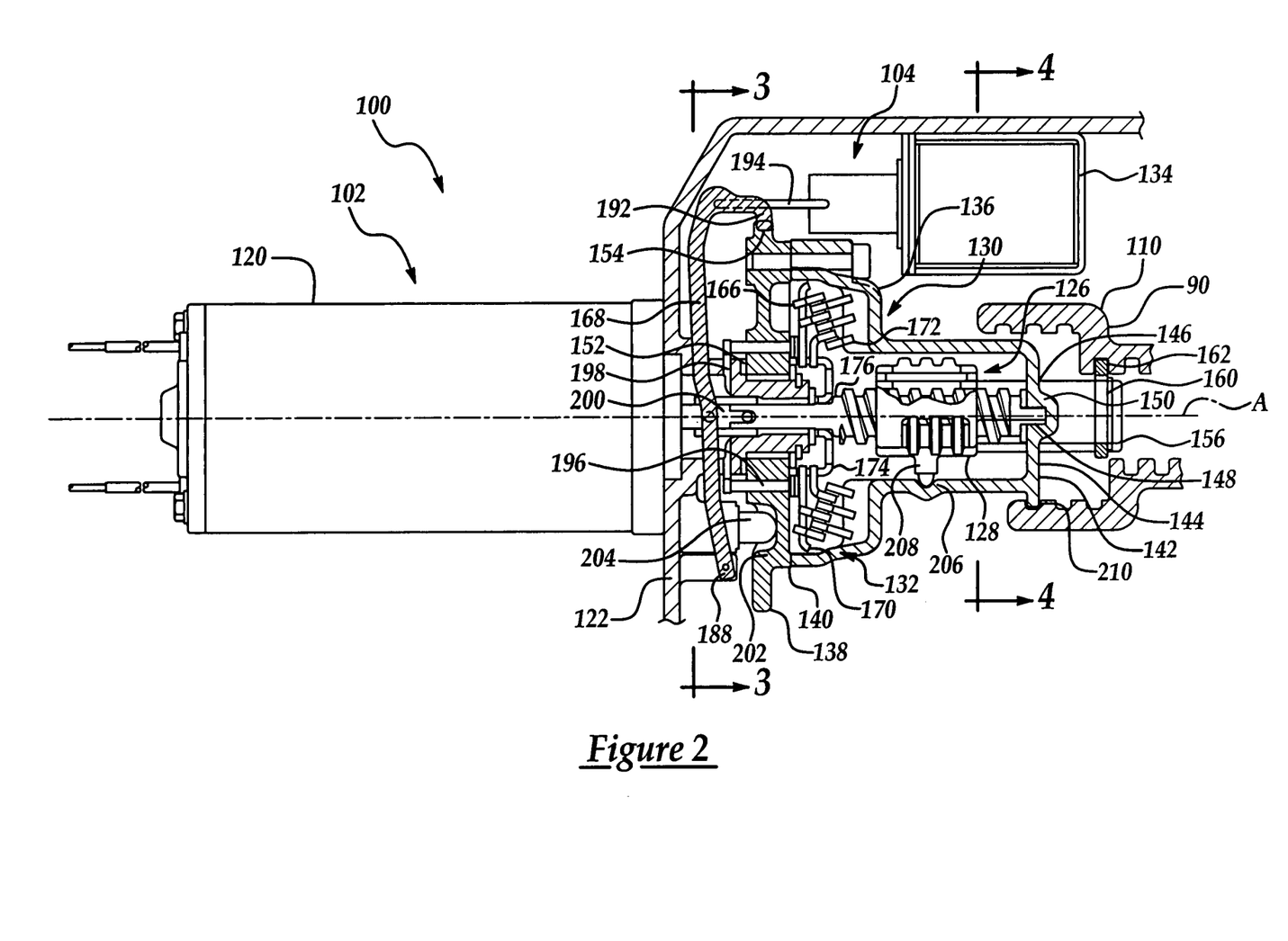
FIG. 2 is a cross sectional side view of the electromechanical gear actuation system of the present invention that may be employed with a dual clutch transmission of the type illustrated in FIG. 1.

To operatively engage a particular shifter rail and move the shift fork and synchronizer in a particular direction, the transmission of the present invention also includes a gear actuation system generally indicated at 100 in FIG. 2. The gear actuation system 100 includes a motor assembly generally indicated at 102, that is disposed within the transmission adjacent to the plurality of shifter rails 90, 92, 94, and 96 and is adapted to provide a first motive force to cause one of the shifter rails to be selectively engaged. The motor assembly 102 is further adapted to provide a second motive force to operatively drive the engaged shifter rail to cause its respective shift fork and synchronizer to engage and disengage one of its respective gear sets. A solenoid assembly, generally indicated at 104, is disposed upon the motor assembly and adapted to selectively control the gear actuation system 100 so as to control when the motor assembly 102 provides the first motive force and when the motor assembly 102 provides the second motive force.

As previously mentioned, the synchronizers 24 are double sided and adapted to slidingly engage a first gear set to its respective shaft when moved in one direction and further adapted to slidingly engage a second gear set to the same respective shaft when moved in the opposite direction. Each double-sided synchronizer is operatively moved by one shift fork. Each shifter rail 90, 92, 94, and 96 further includes an engagement end 110, 112, 114, and 116 respectively. The shifter rails 90, 92, 94, and 96 are longitudinally shaped so that their engagement ends 110, 112, 114, and 116 are arranged concentrically about an axis "A." More importantly, as shown in FIGS. 2 and 4, each of the engagement ends 110, 112, 114, and 116 have two sections of threads 118 and 119 longitudinally disposed thereon such that the sections of threads 118, 119 are oriented radially inward for a purpose that will be described in greater detail below.

The motor assembly 102 includes a reversible electric motor 120 having a motor housing 122, a threaded motor output shaft 124, and a roller screw assembly, generally indicated at 126. The motor assembly 102 is oriented so that the motor output shaft 124 is aligned with axis "A" within the concentrically arranged engagement ends of the shifter rails. The roller screw assembly 126 is operatively disposed about the motor output shaft 124 and is adapted to rotate within the concentrically arranged engagement ends 110, 112, 114, and 116 of the shifter rails 90, 92, 94, and 96. As shown in the figures, the roller screw assembly 126 includes a threaded roller nut 128, which threadably engages the motor output shaft 124. The solenoid assembly 104 is disposed about the motor output shaft 124 and includes an actuator housing generally indicated at 130, a clutch mechanism generally indicated at 132, and an electrically operated solenoid 134. More specifically, the actuator housing 130 is disposed about the roller screw assembly 126 and is adapted to provide a first engagement position in which the actuator housing 130 is engaged to the roller screw assembly 126 such that rotation of the motor output shaft 124 causes the roller screw assembly 126 to rotate with the output shaft 124 thereby providing the first motive force. The actuator housing 130 is further adapted to provide a second engagement position in which the actuator housing 130 is engaged to the motor assembly 102 such that rotation of the motor output shaft 124 causes the roller screw assembly 126 to move axially along the motor output shaft 124, thereby providing the second motive force.

The actuator housing 130 has a first portion 136 and a second portion 138 that cooperatively form a generally cup-shaped enclosure that is rotatively disposed about the motor output shaft 124. The first portion 136 of the actuator housing is cup-shaped having an open end 140 and a closed end 142. The closed end 142 is defined by a front face 144 that is oriented radially to the motor output shaft 124. The front face 144 includes a series of slots 146 radially oriented with respect to the motor output shaft 124 and a receiving bore 148 in a central raised nipple 150 that accepts and rotatively supports the end of the motor output shaft 124. The second portion 138 is a back plate that is mounted to the first portion 136 and encloses the roller screw assembly. The back plate 138 of the actuator housing 130 is rotatively mounted to the motor housing 122 by a bearing 152. The outer circumferential edge of the back plate 138 includes a series of grounding lugs 154 that extend radially outward.

Figure 4:
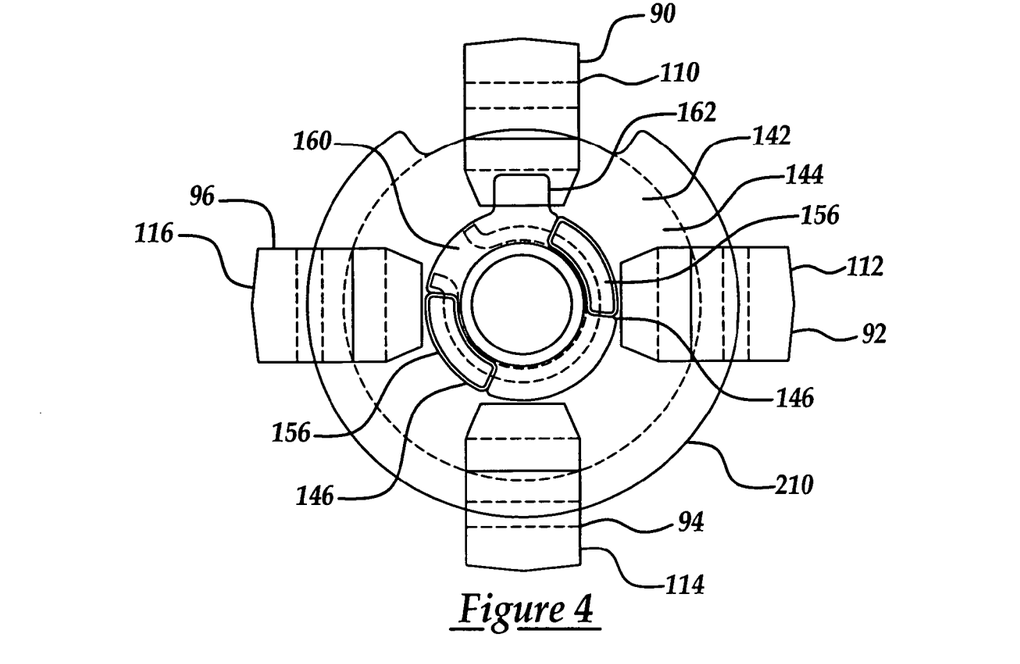
FIG. 4 is a cross sectional end view of the electromechanical gear actuation system of the present invention taken substantially along line 4—4 in FIG. 2.

As shown in FIGS. 2 and 4, the roller nut 128 has a segmented sleeve 156 that extends through the slots 146 in the front face 144 of the actuator housing 130. This rotatively locks the roller nut 128 to the actuator housing 130, but allows the roller nut 128 to move longitudinally along the motor output shaft 124 with respect to the actuator housing 130 when the actuator housing 130 is held stationary. The roller screw assembly 126 also includes an actuator ring 160 having an engagement tab 162 that is fixedly mounted to the end of the segmented sleeve 156 of the roller nut 128 that extends through the actuator housing slots 158. The engagement tab 162 serves as a small angular portion of a male thread. In their concentric arrangement, the engagement ends 110, 112, 114, and 116 of the shifter rails 90, 92, 94, and 96 circumferentially surround the actuator ring 160 of the gear actuator system 100. The engagement ends 110, 112, 114, and 116 of the shifter rail 90, 92, 94, and 96 provide separate angular portions of cooperative female threads 118 that interact with the engagement tab 162. When the roller nut 128 and its engagement tab 162 are caused to rotate, as will be discussed below, the engagement tab 162 is adapted to selectively and sequentially engage the threads 118 on the engagement ends 110, 112, 114, and 116 of the shifter rails 90, 92, 94, and 96.

The clutch mechanism 132 is mounted between the motor housing 122 and the actuator housing 130 such that actuation of the clutch mechanism 132 causes the actuator housing 130 to be held in either a first or a second engagement position. The clutch mechanism 132 includes a cone clutch 166 and a control strut 168. The cone clutch 166 has a first series of conical plates 170 operatively connected to the motor output shaft 124 and a second series of conical plates 172 operatively connected to the actuator housing 130. The first series of conical plates 170 are mounted to an annular ring 174 that has an open center. The annular ring 174 is slidingly mounted to the motor output shaft 124 by a sliding splined connection indicated at 176. The clutch engagement action is provided by a frictional pressure engagement of the first conical plates 170 to the second conical plates 172. Thus, when the first and second cone clutch plates 170 and 172 are engaged, the actuator housing 130 is engaged to the motor output shaft 124 so that the roller nut 128 rotates with the motor output shaft 124. It should be appreciated that other types of clutch mechanisms may be employed in the alternative over the preferred embodiment of a cone clutch, such as a dog clutch or the like, for example.

Figure 3:
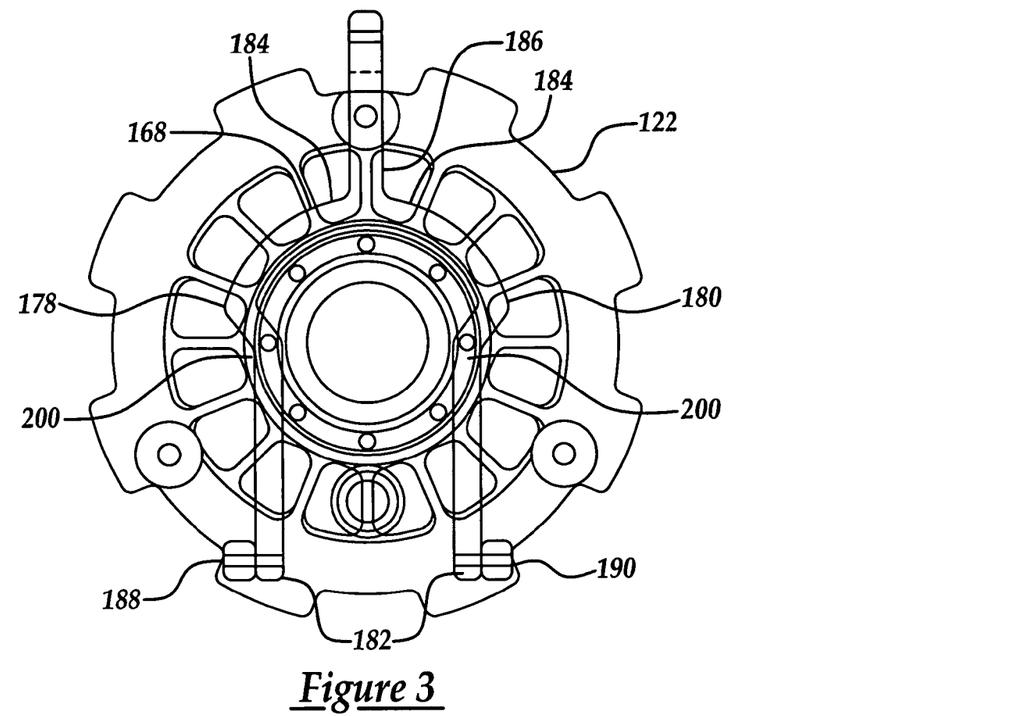
FIG. 3 is a cross sectional end view of the electromechanical gear actuation system of the present invention taken substantially along line 3—3 in FIG. 2.

As best shown in FIG. 3, the control strut 168 has a general wishbone shape with two legs 178 and 180. Each leg has a distal end 182 and a proximate end 184. The distal ends 182 of the legs 178, 180 are spaced apart from each other and the proximate ends 184 are joined together at a central body 186. The control strut 168 is disposed about the motor housing 122 such that the legs 178, 180 extend around the motor output shaft 124 on either side of the motor assembly 120. The distal ends 182 of the legs 178, 180 of the control strut 168 are pivotably mounted to the motor housing at pivot points 188 and 190. Referring to FIG. 2, the central body 186 includes a grounding pawl 192 and a link arm 194. The link arm 194 is further connected to the electrically operated solenoid 134. A sleeve 196 is slidingly disposed about the bearing 152 on the motor housing 122. A thrust washer 198 is in operative contact with one end of the sleeve 196 and the opposite end of the sleeve 196 is in operative contact with the annular ring 174. A contact point 200 on each leg 178, 180 of the control strut 168 slidingly contacts the thrust washer 198.

To provide the first motive force and select a particular shifter rail and thereby a particular gear set for engagement or disengagement, the clutch mechanism 132 must engage and fix the actuator housing 130 to the motor output shaft 124. To actuate the clutch mechanism 132 and cause the clutch plates 170, 172 to be engaged, the control strut 168 is used as a lever and the central body 186 is drawn away from the motor housing 122 by the solenoid 134 through the link arm 194. In this manner, the contact points 200 on the legs 178, 180 of the control strut 168 longitudinally press against the thrust washer 198, which cases the sleeve 196 to force the first series of clutch plates 170 attached to the annular ring 174 into frictional engagement with the second series of clutch plates 172. This action causes the actuator housing 130 and the roller nut 128 to be engaged to the motor output shaft 124. Thus, with the cone clutch 166 engaged, specific angular rotation of the motor output shaft 124 causes rotation of the roller nut 128 and the actuator housing 130 so that the engagement tab 162 provides a selective engagement with a particular one of the concentric shifter rails 90, 92, 94, and 96 that are located about the motor shaft at a particular angular, or polar, position. As shown in FIG. 2, the back plate 138 of the actuator housing 130 includes a plurality of polar detents 202 that coincide with the angular positions of the plurality of concentric shifter rails 90, 92, 94, and 96. The motor housing 122 includes a spring-biased locator 204 that extends and engages the polar detents 202. Thus, the polar detents 202 provide for a positive alignment of the actuator housing 130 and thereby the engagement tab 162 with the each of the respective shifter rails 90, 92, 94, and 96.

To provide the second motive force and operatively drive the engaged shifter rail to cause its respective the shift fork and synchronizer to engage and disengage one of its respective gear sets, the clutch mechanism 132 must disengage so that the actuator housing 130 is released from the motor output shaft 124 and fixed to the motor housing 122. Once the engagement tab 162 has been rotated to engage a particular shifter rail 90, 92, 94, or 96, the solenoid 134 is de-energized, the cone clutch 166 is disengaged and the control strut 168 returns to its first position. This releases the actuator housing 130 from the motor output shaft 124. Additionally, in the first, or released position, the grounding pawl 192 on the control strut 168 engages one of the grounding lugs 154 on the outer circumference of the actuator housing 130. This locks the actuator housing 130 to the control strut 168 and thereby to the motor housing 122, which prevents it from rotating. In other words, with the solenoid 134 de-energized, the actuator housing 130 is rotationally fixed and will not rotate with the motor output shaft 124.

Once the actuator housing 130 is fixed, or grounded, to the motor housing, the motor 120 is electrically driven to cause the motor output shaft 124 to rotate. With the actuator housing 130 fixed, the roller nut 128 moves along the threads of the motor output shaft 124 so that the segmented sleeve 156 will slidingly move longitudinally through the slots 146 in the front face 144 of the actuator housing 130. Thus, the engagement tab 162 will move axially either toward or away from the motor housing 122 to drive the selected shifter rail 90, 92, 94, or 96 longitudinally along the motor output shaft 124. The direction in which the selected shift rail is driven relates to the desired action (i.e., moving a particular synchronizer in or out of engagement). To assist in positively locating and aligning to the neutral position of each of the shifter rails 90, 92, 94, and 96, the actuator housing 130 further includes a neutral detent 206 and the roller nut 128 further includes a spring-biased locator 208 that extends radially outward to engage the neutral detent 206. Thus, as the motor output shaft 124 is rotated to move the shifter rail 90, 92, 94, or 96 toward or away from the motor housing 122 the neural position for the shifter rails 90, 92, 94, and 96 is positively located by the neutral detent 206.

To maintain the neutral status of the other gear sets while moving the engaged shifter rail, the actuator housing 130 still further includes a male threaded, locking ring 210 formed about its outer circumference at the front face 144. This locking ring 210 engages the female threads 119 of the other concentric non-active shifter rails 90, 92, 94, or 96 so that they are held in place by the grounded actuator housing 130 as the motor 120 drives the desired shift fork.

In this manner, the present invention provides a dual clutch transmission having an electromechanical gear actuation and selection system that as a single unit efficiently performs both gear selection and gear engagement and which replaces the many separate hydraulic components previously employed to operatively actuate and control gear selection and engagement.

Figure 5:
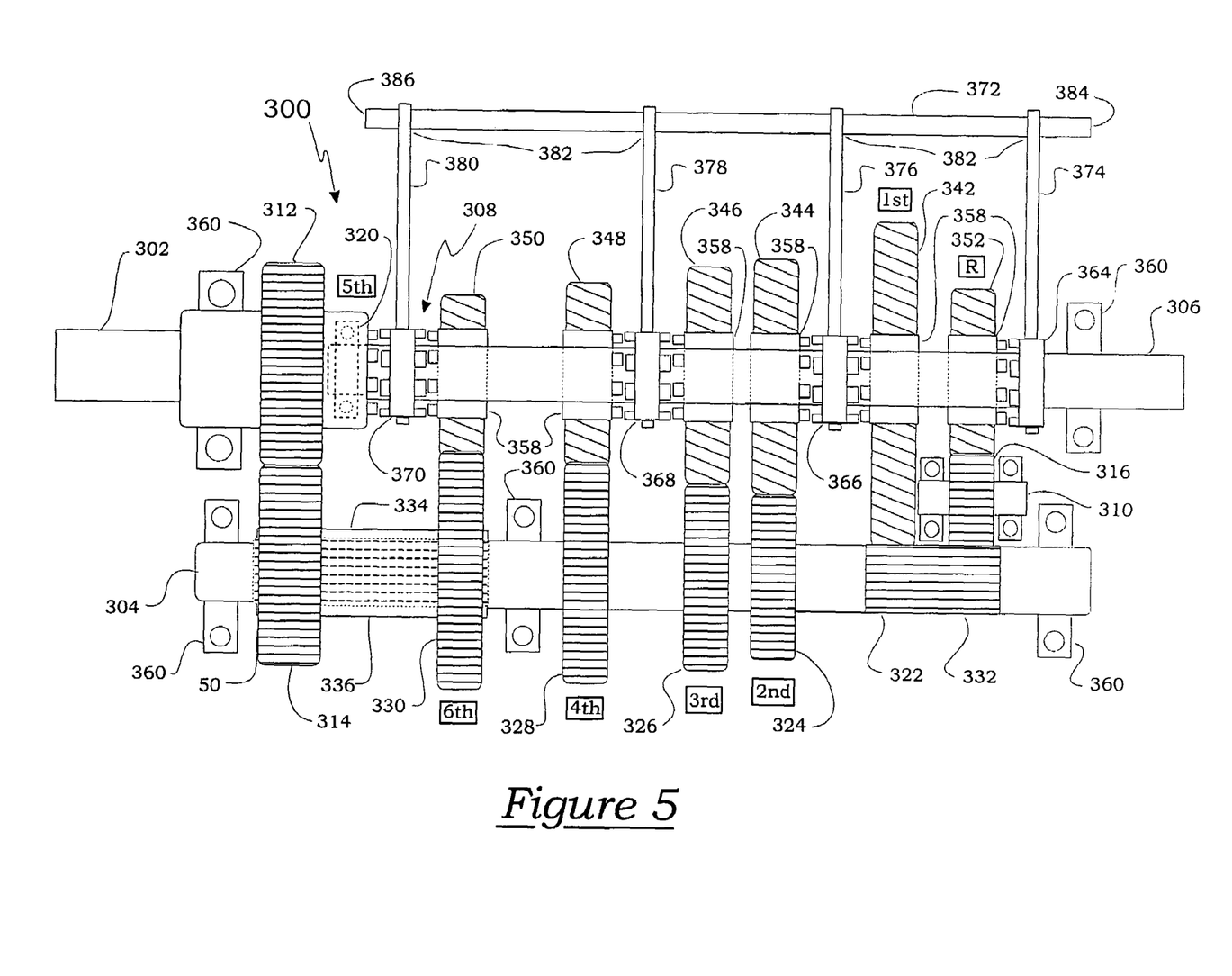
FIG. 5 is a generalized schematic illustration of an automated manual transmission that may be employed with the present invention.

Another embodiment of a transmission having an electromechanical gear actuation system of the present invention is generally indicated at 300 in FIG. 5. In this particular example, FIG. 5 schematically illustrates an automated manual transmission 300, which has the general underlying structural form of a 6-speed manual transmission, such as produced by GETRAG GmbH & Cie KG, Untergruppenbach, Germany, and others. The transmission 300 of the present invention includes an input shaft 302, a counter or lay shaft 304, an output shaft 306, a plurality of synchronizers, generally indicated at 308, and a reverse counter shaft 310.

The automated manual transmission 300 forms a portion of a vehicle powertrain and is responsible for taking a torque output from a prime mover, such as an internal combustion engine, and transmitting the torque through selectable gear ratios to the vehicle drive wheels. The automated manual transmission 300 operatively routes the applied torque from the engine to the output shaft 306. Although not shown in the illustrations for simplicity, it should be appreciated that the automated manual transmission 300 will include some type of dry clutch mechanism having a pressure plate and disc assembly that fictionally interacts with the flywheel of the engine to transfer torque from the engine to the input shaft 302.

The output shaft 306 of the automated manual transmission is coaxial to the input shaft 302. The forward end of the output shaft 306 is retained in and supported by pilot bearing 320 that is fitted within the rear end of the input shaft 302. The counter shaft 304 is disposed within the transmission 300 in parallel to the input and output shafts, 302 and 306. The input shaft 302 includes a fixed input drive gear 312 that is in constant mesh with a fixed counter drive gear 314 disposed on the counter shaft 304. The counter shaft 304 and the output shaft 306 include a first and a second series of gears respectively. Each one of the first series of gears interacts with one of the second series of gears to provide the different gear ratios sets used for transferring torque.

In this example of an automated manual transmission of the present invention, a plurality of synchronizers 308 are disposed on the output shaft 306 to selectively engage the gear ratio sets to the output shaft 306. Thus, torque is transferred from the engine through a clutch assembly, to the input shaft 302, to the counter shaft 304, and to the output shaft 306 through one of the gear ratio sets. The output shaft 306 further provides the output torque to the remainder of the powertrain. Additionally, the reverse counter shaft 310 includes an intermediate gear 316 that is disposed between one of the first series of gears and one of the second series of gears, which allows for a reverse rotation of the output shaft 306. Each of these components will be discussed in greater detail below.

The counter shaft 304 includes the opposing, or counter, gears to those on the output shaft 306. As shown in FIG. 5, the counter shaft 304 includes and fixedly retains the counter drive gear 314, a first counter gear 322, a second counter gear 324, a third counter gear 326, a fourth counter gear 328, a sixth counter gear 330, and a reverse counter gear 332. The first counter gear 322 and the reverse counter gear 332 are formed directly into the counter shaft 304 as a set of gear teeth. The sixth counter gear 330 and a counter drive gear 314 are formed on a sleeve 334 that is rotationally fixed to the counter shaft 304 by a spline interface as indicted at 336. The corresponding second series of gears or the output gear sets 342, 344, 346, 348, 350, and 352 respectively are supported about the output shaft 306 by bearing assemblies 358 so that their rotation is unrestrained unless the accompanying synchronizer 308 is engaged, as will be discussed in greater detail below. The fixed input drive gear 312 is meshingly engaged to the fixed counter drive gear 314 so that the input shaft 302 always drives the counter shaft 304. The fixed input drive gear 312 is also the same size as the fixed counter drive gear 314 so that the input shaft 302 and the counter shaft 304 rotate at the same speed.

The reverse counter shaft 310 is a relatively short shaft having a single reverse intermediate gear 316 that is disposed between, and meshingly engaged with, the reverse counter gear 332 formed directly in the counter shaft 304 and the reverse output gear 352 on the output shaft 306. Thus, when the reverse counter gear 332 turns the reverse intermediate gear 316 on the reverse counter shaft 310 and the reverse output gear 352 is engaged to the output shaft 306, the output shaft 306 is turned in reverse rotation to the forward gear rotation. It should be appreciated that all of the shafts of the automated manual transmission 300 are disposed and rotationally secured within the transmission 300 by some manner of bearing assembly such as roller bearings, for example, shown at 360 in FIG. 5. It should be further appreciated that the counter gears may be formed directly on the counter shaft 304 or may be fixedly mounted to the counter shaft 304 by any of a variety of physical means. For example, in this particular case as shown in the figures, the counter drive gear 314 and the sixth counter gear 330 are fixedly mounted to the counter shaft 304 by a splined interaction to facilitate assembly of the transmission, yet these gears may also be mounted to the counter shaft 304 in any number of different ways.

The engagement and disengagement of the various forward and reverse gears is accomplished by the actuation of the synchronizers 308 within the transmission 300. As shown in FIG. 5 in this example of an automated manual transmission 300, there are four synchronizers 364, 366, 368, and 370 that are utilized to shift through the six forward gears and reverse. It should be appreciated that there are a variety of known types of synchronizers that are capable of engaging a gear to a shaft and that the particular type employed for the purposes of this discussion is beyond the scope of the present invention. Generally speaking, any type of synchronizer that is movable by a shift fork or like device may be employed. As shown in the representative example of FIG. 5, the synchronizers 308 are two sided and dual actuated such that they engage one gear to its respective shaft when moved off of a center neutralized position to the right and engage another gear to its respective shaft when moved to the left.

Specifically with reference to the example illustrated in FIG. 5, synchronizer 366 can be actuated to the right to engage the first output gear 342 to the output shaft 306 or actuated to the left to engage the second output gear 344 to the output shaft 306. Synchronizer 368 can be actuated to the right to engage the third output gear 346 or actuated to the left to engage the fourth output gear 348 to the output shaft 306. Likewise, synchronizer 370 can be actuated to the left to engage the coupling section 310 of the output shaft 306 directly to the input shaft 302. This provides a direct connection, which is the desired 1:1 gear ratio for fifth gear. Synchronizer 370 can also be actuated to the right to engage the sixth output gear 350 to the output shaft 306. Synchronizer 364 is actuated to the right to engage the reverse output gear 352 to the output shaft 306. There is no gear set to engage to the left of synchronizer 364. It should be appreciated that this example of the automated manual transmission is representative and that other synchronizer placement, gear placement, and gear set arrangements are possible without departing from the scope of the present invention.

It should be further appreciated that the general operation of the automated manual transmission 300 may be managed by some type of higher-level control device such as an electronic control unit (ECU) that oversees the functioning of the operation of the vehicle. It should be further appreciated that the transmission may also be designed to take direct inputs from a variety of sources to control the functions of the transmission directly such that a cooperative interaction with other vehicle control devices may be employed rather than a transmission management subordination scheme under a higher-level control device To control gear selection and gear actuation, the automated manual transmission 300 employs a single shifter rail 372 that is slidingly disposed within the transmission parallel to the shafts. The shifter rail 372 includes a plurality of shift forks, and in particular, one shift fork for each synchronizer. As shown in FIG. 5, shift forks 374, 376, 378, and 380 are slidingly disposed upon the shifter rail 372 and are in operative engagement with synchronizers 364, 366, 368, and 370, respectively. The shifter rail 372 is adapted to rotate and engage one of the shift forks 374, 376, 378, or 380 to the shifter rail at engagement points 382. The shifter rail 372 is adapted to engage one particular shift fork 374, 376, 378, or 380 at a time based on its angular position. In other words, the degree of rotation at which the shifter rail 372 is positioned determines which shift fork is engaged. When one shift fork is engaged, the remaining shift forks stay disengaged and allow for sliding rectilinear movement of the shifter rail 372 and the engaged shift fork.

It should be appreciated that the shifter rail 372 may be operatively engaged to the individual shift forks by a variety of methods. For example, the shifter rail 372 may engage each shift fork through a pin and groove interaction, or by a spring biased detent mechanism. However, the particular manner of engagement of the shifter rail to the shift forks is not within the scope of the present invention. As previously mentioned, the synchronizers 308 are double sided and adapted to slidingly engage a first gear set to its respective shaft when moved in one direction and further adapted to slidingly engage a second gear set to the same respective shaft when moved in the opposite direction. In this manner, the shifter rail 372 will move the engaged shift fork either right or left, as illustrated, from a neutral center position to cause its particular synchronizer to engage either one of its respective gear sets to the shaft.

Figure 6:
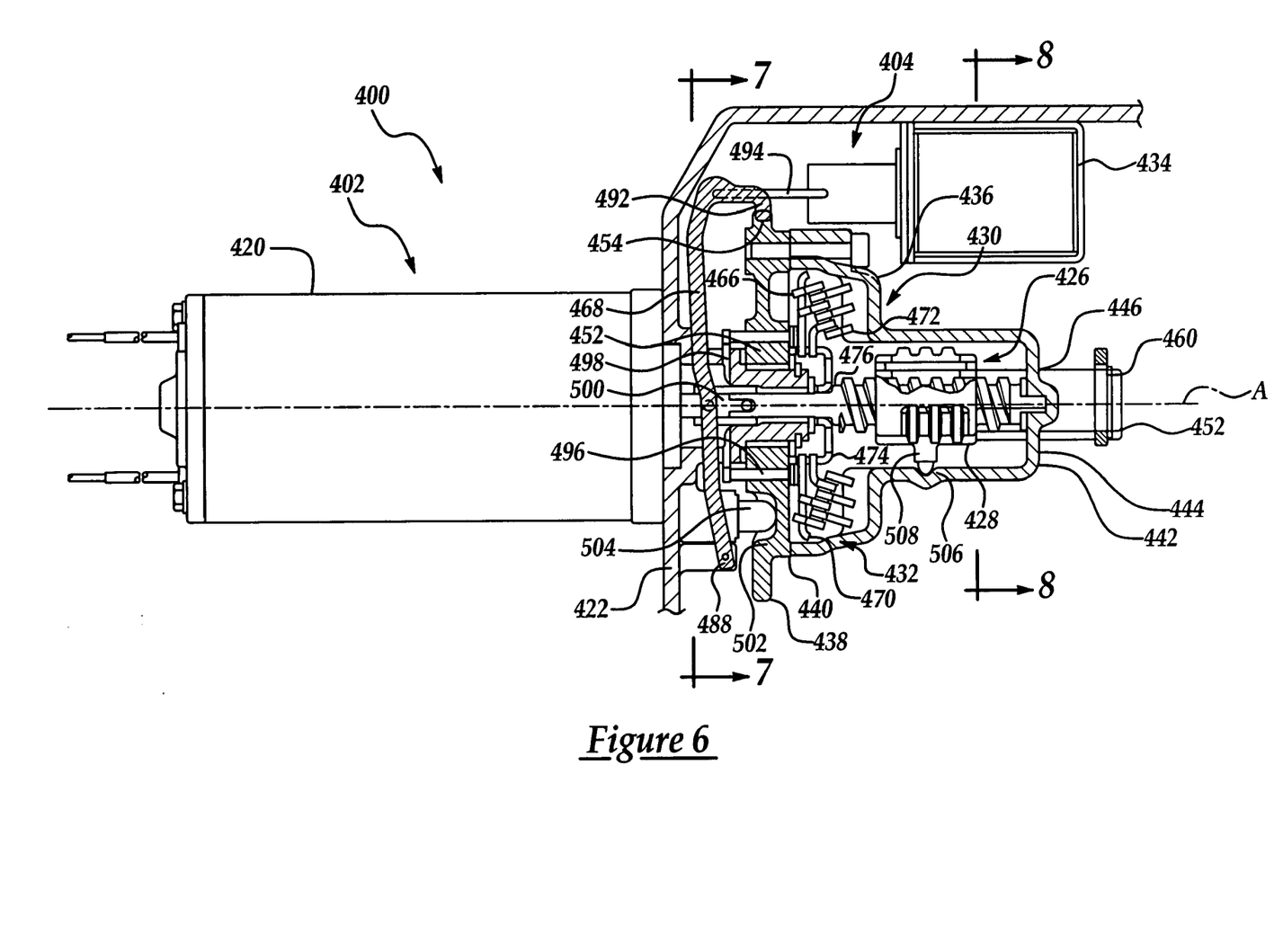
FIG. 6 is a cross sectional side view of the electromechanical gear actuation system of the present invention that may be employed with an automated manual transmission of the type illustrated in FIG. 5.

Another embodiment of the gear actuation system of the present invention, is generally indicated at 400 in FIG. 6, where like numerals incremented by 300 are used to designate like structure. The gear actuation system 400 includes a motor assembly, generally indicated at 402, that is supported by the transmission body at the end of the shifter rail 372 and is adapted to provide a first motive force to cause one of the shift forks 374, 376, 378, or 380 to be selectively engaged. The motor assembly 402 is further adapted to provide a second motive force to operatively drive the engaged shift fork to cause its respective synchronizer to engage and disengage one of its respective gear sets. A solenoid assembly generally indicated at 404, is supported by the motor assembly and adapted to selectively control the gear actuation system 300 so as to control when the motor assembly 402 provides the first motive force and when the motor assembly 402 provides the second motive force.

Figure 7:
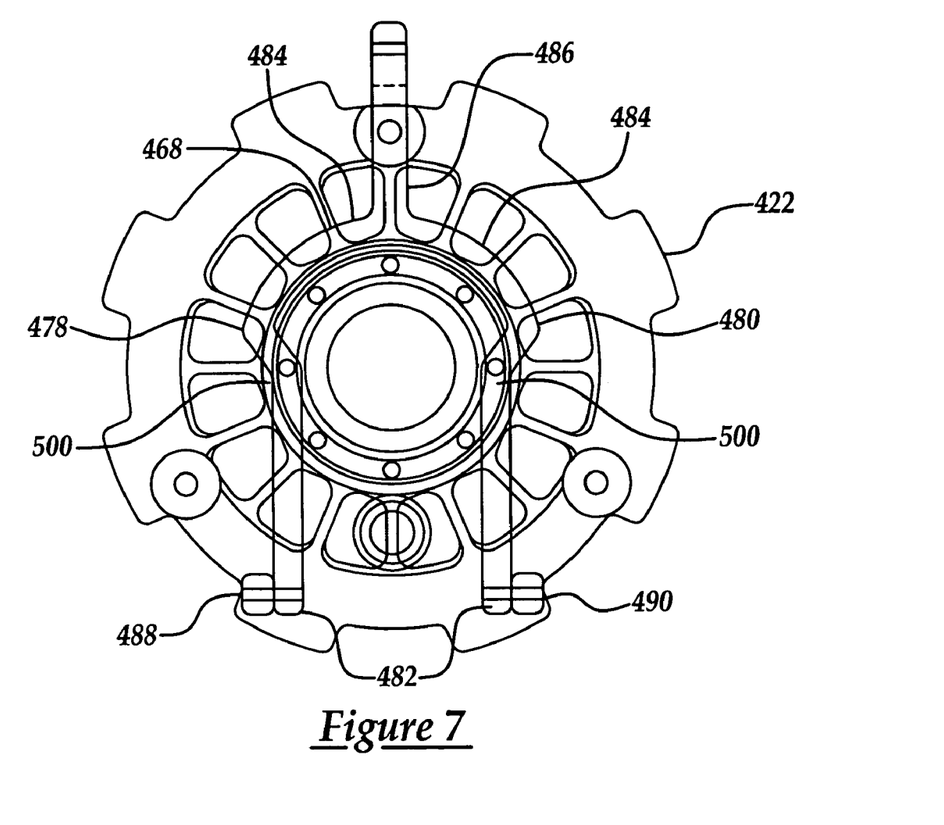
FIG. 7 is a cross sectional end view of the electromechanical gear actuation system of the present invention taken substantially along line 7—7 in FIG. 6.

As shown in FIGS. 6 and 7, the motor assembly 402 includes a single reversible electric motor 420 having a motor housing 422, a threaded motor output shaft 424, and a roller screw assembly generally indicated at 426. The roller screw assembly 426 is operatively disposed about the motor output shaft 424 and is fixedly mounted to the end of the shifter rail 372. As shown in the figures, the roller screw assembly 426 includes a threaded roller nut 428, which threadably engages the motor output shaft 424. The solenoid assembly 404 is disposed about the motor output shaft 424 and includes an actuator housing, generally indicated at 430, a clutch mechanism, generally indicated at 432, and an electrically operated solenoid 434. More specifically, the actuator housing 430 is disposed about the roller screw assembly 426 and is adapted to provide a first engagement position in which the actuator housing 430 is engaged to the roller screw assembly 426 such that rotation of the motor output shaft 424 causes the roller screw assembly 426 to rotate with the motor output shaft 424 thereby providing the first motive force. The actuator housing 430 is further adapted to provide a second engagement position in which the actuator housing 430 is engaged to the motor assembly 402 such that rotation of the motor output shaft 424 causes the roller screw assembly 426 to move axially along the motor output shaft 424, thereby providing the second motive force.

More specifically, the actuator housing 430 has a first portion 436 and a second portion 438 that cooperatively forms a generally cup-shaped enclosure that is rotatively disposed about the motor output shaft 424. The first portion 436 of the actuator housing 430 is cup-shaped having an open end 440 and a closed end 442. The closed end 442 is defined by a front face 444 that is oriented radially to the motor output shaft 424. The front face 444 includes a series of slots 446 radially oriented with respect to the motor output shaft 424 and a receiving bore 448 in a central raised nipple 450 that accepts and rotatively supports the end of the motor output shaft 124. The second portion 438 is a back plate that is mounted to the first portion 436 and encloses the roller screw assembly 426. The back plate 438 of the actuator housing 430 is rotatively mounted to the motor housing 422 by a bearing 452. The outer circumferential edge of the back plate 438 includes a series of grounding lugs 454 that extend radially outward.

The roller nut 428 has a segmented sleeve 456 that extends through slots 446 in the actuator housing 430. This rotatively locks the roller nut 428 to the actuator housing 430, but allows the roller nut 428 to move longitudinally along the motor output shaft 424 with respect to the actuator housing 430 when the actuator housing 430 is held stationary. The roller screw assembly 426 also includes an actuator ring 460 fixedly mounted to the end of the segmented sleeve 456 of the roller nut 428 that extends through the actuator housing slots 458. The actuator ring 460 also serves to physically secure the end of the roller nut 428 to the end 384 (FIG. 5) of the shifter rail 372. It should be appreciated any variety of retaining devices may be employed to ensure a physical link between the roller nut 428 and the shifter rail 372 as long as the connection means ensures that the roller nut 428 can impart reciprocal rotational and longitudinal movement to the shifter rail 372. It should be further that appreciated that the gear actuation system 400 may also be mounted about the transmission 300 so that the roller nut 428 may be operatively connected to the other end 386 (FIG. 5) of the shifter rail 372.

The clutch mechanism 432 is mounted between the motor housing 422 and the actuator housing 430 such that actuation of the clutch mechanism 432 causes the actuator housing 430 to be held in either a first or a second engagement position. The clutch mechanism 432 includes a cone clutch 466 and a control strut 468. The cone clutch 466 has a first series of conical plates 470 operatively connected to the motor output shaft 424 and a second series of conical plates 472 operatively connected to the actuator housing 430. The first series of conical plates 470 are mounted to an annular ring 474 that has an open center. The annular ring 474 is slidingly mounted to the motor output shaft 424 by a sliding splined connection indicated at 476. The clutch engagement action is provided by a frictional pressure engagement of the first conical plates 470 to the second conical plates 472. Thus, when the first and second cone clutch plates 470 and 472 are engaged, the actuator housing 430 is engaged to the motor output shaft 424 so that the roller nut 428 rotates with the motor output shaft 424. It should be appreciated that other types of clutch mechanisms may be employed in the alternative over the preferred embodiment of a cone clutch, such as a dog clutch and the like, for example.

As best shown in FIG. 7, the control strut 468 has a general wishbone shape with two legs 478 and 480. Each leg has a distal end 482 and a proximate end 484. The distal ends 482 of the legs 478, 480 are spaced apart from each other and the proximate ends 484 are joined together at a central body 486. The control strut 468 is disposed about the motor housing 422 such that the legs 478, 480 extend around the motor output shaft 424 on either side of the motor assembly 420. The distal ends 482 of the legs 478, 480 of the control strut 468 are pivotably mounted to the motor housing at pivot points 488 and 490. Referring to FIG. 6, the central body 486 includes a grounding pawl 492 and a link arm 494. The link arm 494 is further connected to the electrically operated solenoid 434. A sleeve 496 is slidingly disposed about the bearing 452 on the motor housing 422. A thrust washer 498 is in operative contact with one end of the sleeve 496 and the opposite end of the sleeve 496 is in operative contact with the annular ring 474. A contact point 500 on each leg 478, 480 of the control strut 468 slidingly contacts the thrust washer 498.

Figure 8:
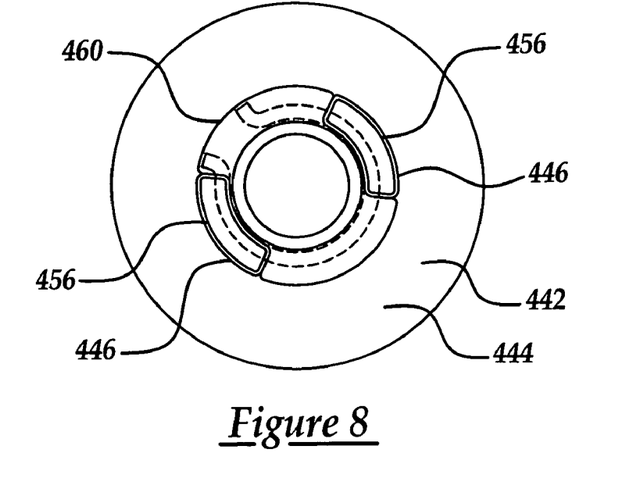
FIG. 8 is a cross sectional end view of the electromechanical gear actuation system of the present invention taken substantially along line 8—8 in FIG. 6

To provide the first motive force and select a particular shifter rail and thereby a particular gear set for engagement or disengagement, the clutch mechanism 432 must engage and fix the actuator housing 430 to the motor output shaft 424. To actuate the clutch mechanism 432 and cause the clutch plates 470, 472 to be engaged, the control strut 468 is used as a lever and the central body 486 is drawn away from the motor housing 422 by the solenoid 434 through the link arm 494. In this manner, the contact points 500 on the legs 478, 480 of the control strut 468 longitudinally press against the thrust washer 498, which causes the sleeve 496 to force the first series of clutch plates 470 attached to the annular ring 474 into frictional engagement with the second series of clutch plates 472. This action causes the actuator housing 430 and the roller nut 428 to be engaged to the motor output shaft 424. Thus, with the cone clutch 466 engaged, specific angular rotation of the motor output shaft 424 causes rotation of the roller nut 428 and the actuator housing 430 and thereby the shifter rail 372 so that the shifter rail 372 provides a selective engagement with a particular one of the shift forks 374, 376, 378, or 380 at a particular angular, or polar, position. This is shown in FIG. 8, which illustrates the angular positions of the roller nut 428 and thereby the shifter rail 372 that are indicative of the shifter rail engagement to a particular shift fork and synchronizer.

Referring again to FIG. 6, the back plate 438 of the actuator housing 430 includes a plurality of polar detents 502 that coincide with the angular positions of the plurality of shift forks 374, 376, 378, or 380. The motor housing 422 includes a spring-biased locator 504 that extends and engages the polar detents 502. Thus, the polar detents 502 provide for a positive alignment of the actuator housing 430 and thereby provide a positive alignment of the shifter rail 372 with each of the respective shift forks 374, 376, 378, and 380.

To provide the second motive force and operatively drive the engaged shift fork to cause its respective synchronizer to engage and disengage one of its respective gear sets, the clutch mechanism 432 must disengage so that the actuator housing 430 is released from the motor output shaft 424 and fixed to the motor housing 422. Once the shifter rail 372 has been rotated to engage a particular shift fork, the solenoid 434 is de-energized, the cone clutch 466 is disengaged and the control strut 468 returns to its first position. This releases the actuator housing 430 from the motor output shaft 424. Additionally, in the first, or released position, the grounding pawl 492 on the control strut 468 engages one of the grounding lugs 454 on the outer circumference of the actuator housing 430. This locks the actuator housing 430 to the control strut 468 and the motor housing 422, which prevents it from rotating. In other words, with the solenoid 434 de-energized, the actuator housing 430 is rotationally fixed and will not rotate with the motor output shaft 424.

Once the actuator housing 430 is fixed, or grounded, to the motor housing 422, the motor 420 is electrically driven to cause the motor output shaft 424 to rotate. With the actuator housing 430 fixed, the roller nut 428 moves along the threads of the motor output shaft 424 so that the segmented sleeve 456 will slidingly move longitudinally through the slots 446 in the actuator housing 430. Thus, the actuator ring 460 engagement with the end (384 or 386) of the shifter rail 372 will move the shifter rail, and the selected shift fork 374, 376, 378, or 380, axially either toward or away from the motor housing 422. The direction in which the selected shift fork is driven relates to the desired action (i.e., moving a particular synchronizer in or out of engagement). To assist in positively locating and aligning with the neutral position of the shifter rail 372, the actuator housing 430 further includes a neutral detent 506 and the roller nut 428 further includes a spring-biased locator 508 that extends outward to engage the neutral detent 506. As the motor output shaft 424 is rotated to move the shifter rail 372 toward or away from the motor housing 422 the neural position for the shifter rail 372 is positively located by the neutral detent. Thus, as the motor output shaft 424 is rotated to move the shifter rail 372, one of the shift forks 374, 376, 378, or 380, and the respective synchronizer 308, toward or away from the motor housing 442, the neural position for the shifter rail 372 is positively located by the neutral detent 506.

In this manner, the present invention provides a automated manual transmission having an electromechanical gear actuation and selection system that as a single unit efficiently performs both gear selection and gear engagement and which replaces the many separate hydraulic components previously employed to operatively actuate and control gear selection and engagement.

The above embodiments of the present invention overcome the limitations of the current hydraulically controlled automated manual transmissions. The present invention provides a transmission having an electromechanical gear actuation system that has a greatly simplified and more efficient manner of controlling the operation of the gear selection and gear engagement. In this manner, the costly and inefficient approaches of the prior art for automating the relatively simple structure of a manual type transmission are overcome. More precisely, the present invention avoids the use of several separate and generally complex hydraulic components to provide control over the selective gear actuation in either an AMT or a DCT. Further, by not adding the structural complexity of the hydraulic control and actuation systems the present invention avoids the additional manufacturing and assembly costs that are added to an AMT or DCT transmission when hydraulic controls are employed. Additionally, by employing a single electromechanical gear actuation system as opposed to a number of separate hydraulic and electro-hydraulic controls, the transmission of the present invention avoids the need for having the vast wiring harness necessary to accommodate these component parts. Thus, the wiring harness for the transmission of the present invention is also simplified and costs less to produce than those of prior art systems. Overall, the transmission of the present invention having an electromechanical gear actuation system is more efficient and cost effective that any of the prior art designs for automated manual transmissions and dual clutch transmissions.

The invention has been described in an illustrative manner. It is to be understood that the terminology that has been used is intended to be in the nature of words of description rather than of limitation. Many modifications and variations of the invention are possible in light of the above teachings. Therefore, within the scope of the appended claims, the invention may be practiced other than as specifically described.

I claim:

1. A transmission for a motor vehicle having an electro-mechanical gear actuation system for gear selection and gear engagement and disengagement, said transmission including:
   at least one input shaft;
   a counter shaft;
   a plurality of gear sets rotatively disposed on said at least one input shaft and said counter shaft, said gear sets adapted to be operatively engaged to and disengaged from the associated shafts;
   a plurality of synchronizers disposed between said gear sets, said synchronizers adapted to operatively engage and disengage said gear sets to and from the associated shafts;
   at least one shifter rail slidingly disposed within said transmission and including a plurality of shift forks, each said shift fork in operative engagement with at least one of said synchronizers, said shifter rail adapted to slidingly move and selectively cause one of said shift forks to move the associated synchronizer;
   a motor assembly supported within said transmission adjacent to said at least one shifter rail adapted to provide a first motive force to cause said at least one shifter rail to selectively engage one of said plurality of shift forks, said motor assembly further adapted to provide a second motive force to operatively drive said shifter rail to cause the associated shift fork and synchronizer to engage and disengage the associated gear set to and from the associated said shaft; and
   a solenoid assembly adapted to selectively control said gear actuation system so as to control when said motor assembly provides said first motive force and when said motor assembly provides said second motive force.

2. A transmission as set forth in claim 1, wherein said motor assembly includes a single reversible electric motor having a housing, an output shaft, and a roller screw assembly, said roller screw assembly operatively disposed about said motor output shaft and adjacent said at least one shifter rail, said roller screw assembly further including an extending engagement tab adapted to selectively engage said at least one shifter rail.

3. A transmission as set forth in claim 2, wherein said solenoid assembly includes an actuator housing disposed about said roller screw assembly adapted to provide a first engagement position in which said actuator housing is engaged to said motor output shaft such that rotation of said motor output shaft causes said engagement tab of said roller screw assembly to rotate with said motor output shaft thereby providing said first motive force, said actuator housing further adapted to provide a second engagement position in which said actuator housing is engaged to said motor housing such that rotation of said motor output shaft causes said roller screw and said engagement tab to move axially along said motor output shaft, thereby providing said second motive force.

4. A transmission as set forth in claim 3, wherein said solenoid assembly further includes a clutch mechanism mounted about said motor between said motor housing and said actuator housing such that actuation of said clutch mechanism causes said actuator housing to move between said first and said second engagement positions.

5. A transmission as set forth in claim 4, wherein said solenoid assembly further includes an electrically operated solenoid mounted about said motor output shaft and adapted to cause said clutch mechanism to operatively actuate.

6. A dual clutch transmission for a motor vehicle having an electro-mechanical gear actuation system for gear selection and gear engagement and disengagement, said transmission including:
   a pair input shafts;
   a counter shaft;
   a plurality of gear sets rotatively disposed on said input shafts and said counter shaft, said gear sets adapted to be operatively engaged to and disengaged from the associated shafts;
   a plurality of synchronizers disposed between said gear sets, said synchronizers adapted to operatively engage and disengage said gear sets to and from the associated shafts;
   a plurality of shifter rails slidingly disposed within said transmission, each said shifter rail having at least one shift fork, each said shift fork in operative engagement with at least one of said synchronizers, said shifter rails adapted to slidingly move and selectively cause the associated said shift fork to move the associated synchronizer;

a motor assembly supported within said transmission adjacent to said plurality of shifter rails adapted to provide a first motive force to cause one of said plurality of shifter rails to be selectively engaged by said motor assembly, said motor assembly further adapted to provide a second motive force to operatively drive said engaged shifter rail to cause its respective said shift fork and said synchronizer to engage and disengage its respective said gear set; and a solenoid assembly adapted to selectively control said gear actuation system so as to control when said motor assembly provides said first motive force and when said motor assembly provides said second motive force.

7. A dual clutch transmission as set forth in claim 6, wherein each of said plurality of synchronizers are double sided and adapted to slidingly engage one of said plurality of gear sets to the associated shaft when moved in one direction and further adapted to slidingly engage another of said plurality of gear sets to the same associated shaft when moved in the opposite direction, each one of said double sided synchronizers operatively moved by one shift fork.

8. A dual clutch transmission as set forth in claim 6, wherein each of said plurality of shifter rails further include an engagement end, each of said engagement ends having a section of threads longitudinally disposed thereon, said shifter rails arranged concentrically about an axis such that said sections of threads are oriented radially inward.

9. A dual clutch transmission as set forth in claim 8, wherein said motor assembly includes a reversible electric motor having a housing, an output shaft, and a roller screw assembly, said roller screw assembly operatively disposed about said motor output shaft and adapted to rotate within said concentrically arranged engagement ends of said shifter rails, said roller screw assembly further including an engagement tab extending therefrom that is adapted to selectively engage said threads of said shifter rails as said roller assembly rotates.

10. A dual clutch transmission as set forth in claim 9, wherein said solenoid assembly includes an actuator housing disposed about said roller screw assembly adapted to provide a first engagement position in which said actuator housing is engaged to said motor output shaft such that rotation of said motor output shaft causes said engagement tab of said roller screw assembly to rotate with said motor output shaft thereby providing said first motive force, said actuator housing further adapted to provide a second engagement position in which said actuator housing is engaged to said motor housing such that rotation of said motor output shaft causes said roller screw and said engagement tab to move rectilinearly along said motor output shaft, thereby providing said second motive force.

11. A dual clutch transmission as set forth in claim 10, wherein said solenoid assembly further includes a clutch mechanism mounted between said motor housing and said actuator housing such that actuation of said clutch mechanism causes said actuator housing to move between said first and said second engagement positions.

12. A dual clutch transmission as set forth in claim 11, wherein said solenoid assembly further includes an electrically operated solenoid that is adapted to cause said clutch mechanism to operatively actuate.

13. An automated manual transmission for a motor vehicle having an electro-mechanical gear actuation system for gear selection and gear engagement and disengagement, said transmission including:

an input shaft;

a counter shaft;

an output shaft;

a plurality of gear sets rotatively disposed on said input shaft, said counter shaft, and said output shaft, said gear sets adapted to be operatively engaged to and disengaged from the associated shafts;

a plurality of synchronizers disposed between said gear sets, said synchronizers adapted to operatively engage and disengage said gear sets to and from the associated shafts;

a shifter rail slidingly disposed within said transmission, said shifter rail including a plurality of shift forks, each said shift fork in operative engagement with at least one of said plurality of synchronizers, said shifter rail adapted to rotate and engage one of said plurality of shift forks to said shifter rail, said shifter rail further adapted to slidingly move to cause the associated engaged shift fork to move its respective said synchronizer;

a motor assembly disposed upon said transmission adjacent to said shifter rail adapted to provide a first motive force to cause said shifter rail to selectively engage one of said plurality of shift forks, said motor assembly further adapted to provide a second motive force to operatively drive said shifter rail to cause the associated engaged shift fork and synchronizer to engage and disengage the associated gear set; and a solenoid assembly adapted to selectively control said gear actuation system so as to control when said motor assembly provides said first motive force and when said motor assembly provides said second motive force.

14. An automated manual transmission as set forth in claim 13, wherein each of said plurality of synchronizers are double sided and adapted to slidingly engage one of said plurality of gear sets to the associated shaft when moved in one direction and further adapted to slidingly engage another of said plurality of gear sets to the same associated shaft when moved in the opposite direction, each one of said double sided synchronizers operatively moved by one shift fork.

15. An automated manual transmission as set forth in claim 14, wherein said motor assembly includes a reversible electric motor having a housing, an output shaft, and a roller screw assembly, said roller screw assembly operatively mounted to said shifter rail and adapted to rotate said shifter rail and further adapted to move said shifter rail longitudinally.

16. An automated manual transmission as set forth in claim 15, wherein said solenoid assembly further includes an actuator housing disposed about said roller screw assembly adapted to provide a first engagement position in which said actuator housing is engaged to said motor output shaft such that rotation of said motor output shaft causes said shifter rail to rotate with said output shaft thereby providing said first motive force, said actuator housing further adapted to provide a second engagement position in which said actuator housing is engaged to said motor housing such that rotation of said motor output shaft causes said roller screw assembly to move axially along said output shaft, thereby providing said second motive force.

17. An automated manual transmission as set forth in claim 16, wherein said solenoid assembly further includes a clutch mechanism mounted between said motor housing and said actuator housing such that actuation of said clutch mechanism causes said actuator housing to move between said first and said second engagement positions.

18. An automated manual transmission as set forth in claim 17, wherein said solenoid assembly further includes an electrically operated solenoid mounted about said motor output shaft that is adapted to cause said clutch mechanism to operatively actuate.

* * * * *